United States Patent
Zhang

(10) Patent No.: US 8,031,914 B2
(45) Date of Patent: Oct. 4, 2011

(54) FACE-BASED IMAGE CLUSTERING

(75) Inventor: Tong Zhang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1294 days.

(21) Appl. No.: 11/545,898

(22) Filed: Oct. 11, 2006

(65) Prior Publication Data

US 2008/0089561 A1 Apr. 17, 2008

(51) Int. Cl.
*G06K 9/00* (2006.01)

(52) U.S. Cl. ........ 382/118; 382/155; 382/156; 382/157; 382/158; 382/159; 382/160; 382/181; 382/224; 382/225

(58) Field of Classification Search ................. 382/118, 382/225, 155–160, 181, 224

See application file for complete search history.

(56) References Cited

U.S. PATENT DOCUMENTS

| | | | |
|---|---|---|---|
| 5,418,895 A | 5/1995 | Lee | |
| 5,550,928 A | 8/1996 | Lu et al. | |
| RE36,041 E | 1/1999 | Turk et al. | |
| 6,282,317 B1 | 8/2001 | Luo et al. | |
| 6,535,636 B1 | 3/2003 | Savakis et al. | |
| 2001/0043727 A1 | 11/2001 | Cooper | |
| 2002/0150280 A1* | 10/2002 | Li | 382/117 |
| 2003/0048950 A1 | 3/2003 | Savakis et al. | |
| 2003/0068100 A1 | 4/2003 | Covell et al. | |
| 2003/0179911 A1* | 9/2003 | Ho et al. | 382/118 |
| 2003/0210808 A1 | 11/2003 | Chen et al. | |
| 2004/0022442 A1* | 2/2004 | Kim | 382/225 |
| 2004/0197013 A1 | 10/2004 | Kamei | |
| 2005/0105780 A1* | 5/2005 | Ioffe | 382/118 |
| 2005/0105806 A1 | 5/2005 | Nagaoka et al. | |
| 2005/0265581 A1* | 12/2005 | Porter et al. | 382/103 |
| 2006/0140455 A1 | 6/2006 | Costache et al. | |
| 2006/0204058 A1* | 9/2006 | Kim et al. | 382/118 |

FOREIGN PATENT DOCUMENTS

WO 20040044823 A 5/2004

OTHER PUBLICATIONS

Berrani et al., Enhancing Face Recognition from Video Sequences using Robust Statistics, Sep. 2005, IEEE Conference on Advanced Video and Signal Based Surveillance, pp. 324-329.*

Sung, K.K.; "Learning and example selection for object and pattern detection" MIT AI Laboratory Technical Report, Jan. 1996, pp. 1-195.

W. Zhao et al, "Face Recognition: A Literature Survey," ACM Computing Surveys, vol. 35, No. 4, Dec. 2003, pp. 399-458.

A. Girgensohn et al., "Leveraging Face Recognition Technology to Find and Organize Photos," Proc. 6th ACM SIGMM Int'l Workshop Multimedia Info. Retrieval, NY, NY (2004).

* cited by examiner

*Primary Examiner* — Bhavesh Mehta
*Assistant Examiner* — Daniel Zeilberger

(57) ABSTRACT

Face-based image clustering systems and methods are described. In one aspect, face regions are detected in images. At least one respective parameter value is extracted from each of the face regions. Ones of the face regions associated with parameter values satisfying a cluster seed predicate are classified as cluster seed face regions. The cluster seed face regions are clustered into one or more clusters. A respective face model is built for each of the clusters. The face models are stored. In another aspect, face regions are detected in images. At least one respective parameter value is extracted from each of the face regions. The face regions are ranked based on the extracted parameter values. The face regions are clustered in rank order into one or more clusters. Representations of ones of the clusters are rendered on a display.

22 Claims, 6 Drawing Sheets

FACE-BASED IMAGE CLUSTERING

BACKGROUND

As individuals and organizations continue to rapidly accumulate large collections of image content, they increasingly will require systems and methods for organizing and browsing the image content in their collections. Many systems allow a user to manually classify images and other digital content by their association with a particular event or subject matter and to segment this digital content based on these classifications. Manual classification systems, however, tend to be time consuming and unwieldy, especially as the size of the digital content collection grows. Some systems are configured to automatically segment digital content, such as images, based on color, shape, or texture features. These automatic segmentation systems, however, often tend to misclassify the digital content because of the inherent inaccuracies associated with classification based on color, shape, or texture features.

In some content-based image retrieval approaches, low level visual features are used to group images into meaningful categories that, in turn, are used to generate indices for a database containing the images. In accordance with these approaches, images are represented by low level features, such as color, texture, shape, and layout. The features of a query image may be used to retrieve images in the databases that have similar features. In general, the results of automatic categorization and indexing of images improve when the features that are used to categorize and index the images more accurately capture the target aspects of the content of the images.

Recently, efforts have been made to detect and classify aspects (e.g., faces and eyes) of human subjects. For example, in one approach, human faces in digital images are organized into clusters. In accordance with this approach, a face image is used to form a first cluster. A face recognizer generates similarity scores based on comparisons of an unassigned face image to each face image in any existing cluster. If a similarity score for the unassigned face image is above a threshold, the unassigned face image is added to the cluster corresponding to the highest similarity score. If the similarity scores for the unassigned face image is below the threshold, the unassigned face image is used to form a new cluster. The process is repeated for each unassigned face image. For each cluster, all the face images contained in the cluster are displayed in a cluster review screen. If a face image does not belong to a particular cluster, the user may delete it from the cluster or reassign to another cluster. If two clusters of faces belong together, the user can merge the clusters.

In a semi-automatic face clustering approach, a face detector is used to automatically extract faces from photos. A face recognizer is used to sort faces by their similarity to a chosen model. In this process, when one or more faces are associated with a person, a model representing those faces is created and unlabeled faces that are sorted in order of their similarity to that model are displayed. The user can select several faces and assign them to the appropriate person with a drag-and-drop interaction technique. The model is updated to incorporate the newly identified faces and the unlabeled faces are resorted by their similarity to the new model. The sorted faces are presented as candidates within a user interface that allows the user to label the faces.

The face models that are built using existing face-based image clustering approaches typically do not accurately represent the faces of the persons they represent. As a result, faces that are ranked closest to a particular face model oftentimes do not correspond to the person that is represented by the model. In particular, if one image is mistakenly included into one cluster, then other images that are similar to this image also will be included into this cluster. In this way, each false alarm may propagate to generate more false alarms. What are needed are face-based image clustering systems and methods that are capable of building more accurate and more robust face models.

SUMMARY

In one aspect of the invention, face regions are detected in images. At least one respective parameter value is extracted from each of the face regions. Ones of the face regions associated with parameter values satisfying a cluster seed predicate are classified as cluster seed face regions. The cluster seed face regions are clustered into one or more clusters. A respective face model is built for each of the clusters. The face models are stored.

In another aspect of the invention, face regions are detected in images. At least one respective parameter value is extracted from each of the face regions. The face regions are ranked based on the extracted parameter values. The face regions are clustered in rank order into one or more clusters. Representations of ones of the clusters are rendered on a display.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail herein cluster images based on face regions that are detected in the images. These embodiments leverage methods of building face models of the clusters that are expected to provide more accurate and more robust clustering results. In some of these embodiments, the clusters are initiated with cluster seed face regions that are selected to provide a more accurate and robust basis for establishing the face clusters. In addition, some embodiments rank the face regions in accordance with one or more parameters that are expected to emphasize face regions that are likely to contain more accurate representations of persons' faces. In these embodiments, the face regions are clustered in order from highest rank to lowest rank to achieve improved clustering results. In some embodiments, user feedback is used to further improve the cluster accuracy of the clustering results.

II. Exemplary Embodiments of a First Image Processing System and its Components

A. Overview of the Image Processing System

Figure 1:
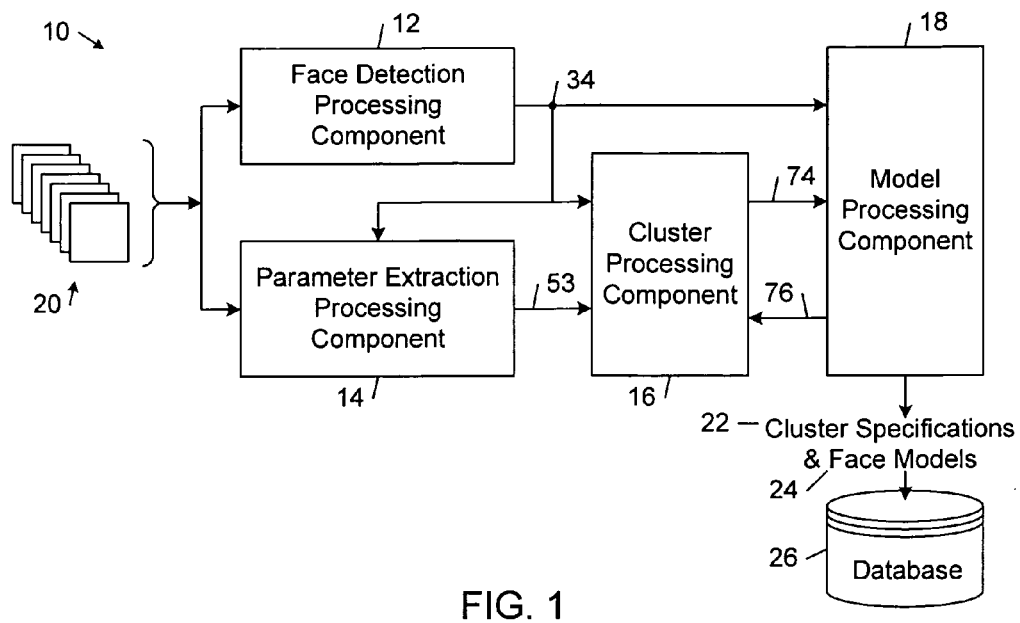
FIG. 1 is a block diagram of an embodiment of an image processing system.

FIG. 1 shows an embodiment of an image processing system 10 that includes a face detection processing component 12, parameter extraction processing component 14, a cluster processing component 16, and a model processing component 18.

In operation, the image processing system 10 processes a collection of input images 20 to generate cluster specifications 22 and cluster face models 24, which are stored in a database 26 in association with the input images 20. Each of the input images 20 may correspond to any type of image, including an original image (e.g., a video keyframe, a still image, or a scanned image) that was captured by an image sensor (e.g., a digital video camera, a digital still image camera, or an optical scanner) or a processed (e.g., sub-sampled, cropped, rotated, filtered, reformatted, enhanced or otherwise modified) version of such an original image. Each cluster specification 22 corresponds to a different respective face that is detected in the associated input image 20. In some embodiments, each cluster specification 22 includes a description of the locations (e.g., universal resource locators (URLs)) of the associated ones of input images 20 containing the constituent faces, along with the locations of the constituent faces (e.g., the coordinates of the bounding boxes containing the face regions) within each of these input images. In some embodiments, the image processing system 10 stores the cluster specifications in respective data structures (e.g., tables or lists) that are linked to the associated ones of the input images 20. In some embodiments, each input image 20 is associated with a respective cluster specification 22 for each face that is detected in the input image 20. Thus, in these embodiments, input images 20 that contain multiple detected faces are associated with multiple cluster specifications 22.

Figure 2:
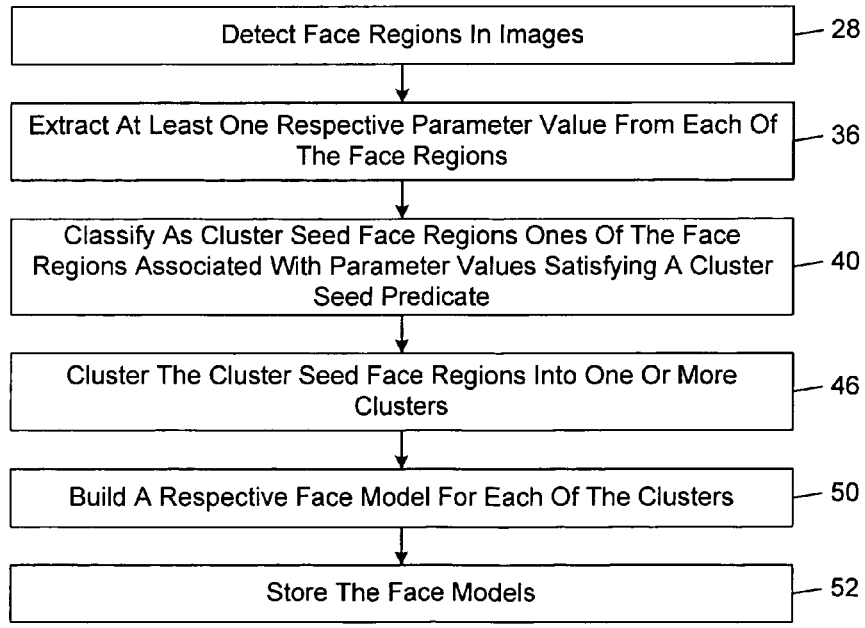
FIG. 2 is a flow diagram of an embodiment of an image processing method.
Figure 3:
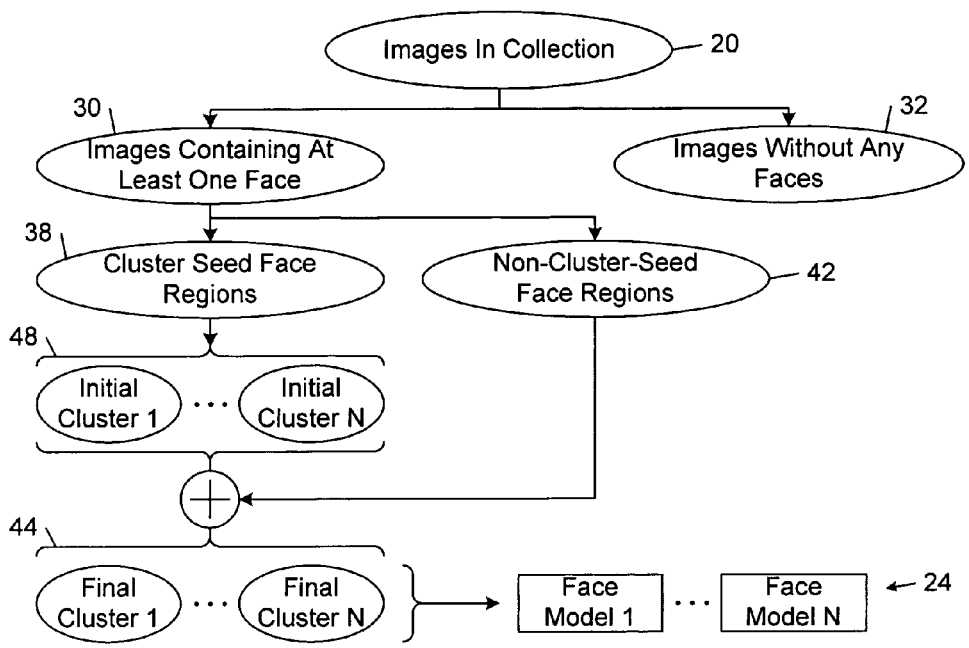
FIG. 3 is a schematic diagram showing information generated during execution of the image processing method of FIG. 2.

FIG. 2 shows an embodiment of a method that is implemented by an embodiment of the image processing system 10 and FIG. 3 shows information that is generated during execution of an illustrative implementation of this method.

In accordance with this method, the face detection processing component 12 detects face regions in the input images 20 (FIG. 2, block 28). Each face region contains at least a portion of a person's face. In this way, the images 20 are segmented into a set 30 of images containing at least one face and a set 32 of images that do not contain any detected faces, as shown in FIG. 3. The parameter extraction processing component 14 extracts at least one respective parameter value 34 from each of the face regions (FIG. 2, block 36). The cluster processing component 16 classifies as cluster seed face regions 38 ones of the face regions associated with parameter values satisfying a cluster seed predicate (FIG. 2, block 40). The face regions that are associated with parameter values that do not satisfy the cluster seed predicate are classified as non-cluster-seed face regions 42. The cluster processing component 16 also clusters the cluster seed face regions into one or more clusters 44 (FIG. 2, block 46). In some embodiments, the clustering process involves segmenting the cluster seed face regions into a set of initial clusters 48 and assigning ones of the non-cluster-seed face regions 42 to the initial clusters 48 to produce the final set of clusters 44. The model processing component 18 builds a respective face model 24 for each of the clusters 44 (FIG. 2, block 50). The model processing component 18 stores the face models 24 in the database 26 (FIG. 2, block 52). In some embodiments, the model processing component 18 also stores the cluster specifications 22 in association with respective ones of the input images 20 in the database 24.

At the end of the automatic clustering process shown in FIG. 2, the images 20 are segmented into a "no face" category, an "other faces" category, and a set of image clusters each containing images with regions that correspond to a respective face of one particular person. Images that contain more than one face may appear in more than one of the image clusters and categories.

In general, the image processing system 10 may be implemented by one or more discrete processing components (or modules) that are not limited to any particular hardware, firmware, or software configuration. In the illustrated embodiment, the processing components 12-18 may be implemented in any computing or data processing environment, including in digital electronic circuitry (e.g., an application-specific integrated circuit, such as a digital signal processor (DSP)) or in computer hardware, firmware, device driver, or software. In this exemplary embodiment, the model processing component 18 is implemented by a face recognition engine. In some embodiments, the functionalities of multiple ones of the processing components 12-18 are combined into a single processing component. In other embodiments, the respective functionalities of each of one or more of the processing components 12-18 are performed by a respective set of multiple processing components.

In some implementations, computer process instructions for implementing the methods that are executed by the image processing system 10 and the data it generates are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

B. Exemplary Embodiments of the Face Detection Processing Component

As explained above, the face detection processing component 12 detects faces in the input images 20. In general, the face detection processing component 12 may use any type of face detection process that determines the presence and location of each face in the input images 20. Exemplary face detection methods include but are not limited to feature-based face detection methods, template-matching face detection methods, neural-network-based face detection methods, and image-based face detection methods that train machine systems on a collection of labeled face samples. An exemplary feature-based face detection approach is described in Viola and Jones, "Robust Real-Time Object Detection," Second International Workshop of Statistical and Computation theories of Vision—Modeling, Learning, Computing, and Sampling, Vancouver, Canada (Jul. 13, 2001), which is incorporated herein by reference. An exemplary neural-network-based face detection method is described in Rowley et al., "Neural Network-Based Face Detection," IEEE Transactions on Pattern Analysis and Machine Intelligence, Vol. 20, No. 1 (January 1998), which is incorporated herein by reference.

In a typical face detection process, the face detection processing component 12 initially determines the presence and rough location of each face in each of the input images 20. After the rough location of a face has been detected, the face detection processing component 12 aligns (or registers) the detected face so that it can be recognized. In this process, one or more feature points in the detected face (e.g., the eyes, the nose tip, and the mouth or lips) are extracted. In general, any type of feature extraction process may be used including but not limited to edge, line and curve based feature extraction methods, extraction methods based on templates that are designed to detect specific features points (e.g., the eyes and mouth), and structural matching methods. For each detected face, the face detection processing component 12 aligns the extracted features in relation to a respective facial bounding box encompassing some or all portions of the detected face. In some implementations, the facial bounding box corresponds to a rectangle that includes the eyes, nose, mouth but not the entire forehead or chin or top of head of a detected face.

The face detection processing component 12 outputs one or more face detection parameter values 34. Exemplary types of face detection parameter values 34 include the number of faces and the locations (e.g., coordinates) of the facial bounding boxes. The face detection processing component 12 passes the face detection parameter values 34 to the parameter extraction processing component 14, the cluster processing component 16, and the model processing component 18.

C. Exemplary Embodiments of the Parameter Extraction Processing Component

In the illustrated embodiments, the parameter extraction processing component 14 determines for each of the face regions respective values for one or more of the following parameters 53: a size (e.g., the vertical and horizontal dimensions or the area) of the facial bounding box reported by the face detection processing component 12; a measure of sharpness of the face region; a measure of exposure of the face region; a measure of contrast of the face region; a measure of saturation of the face region; and a measure of brightness of the face region. The parameter extraction processing component 14 passes the extracted parameter values 53 to the cluster processing component 16.

1. Computing Size Parameter Values

The parameter extraction processing component 14 determines the linear and areal dimensions of the detected face regions from the coordinates of the facial bounding boxes that are reported by the face detection processing component 12 in the face detection parameter values 34.

Figure 4:
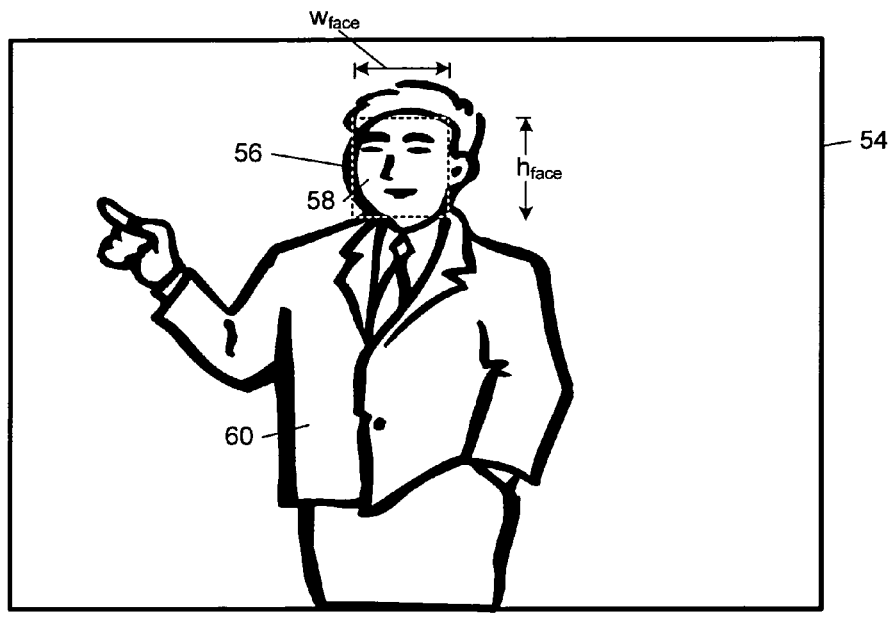
FIG. 4 is a diagrammatic view of an exemplary input image over which is superimposed a boundary demarcating an embodiment of a face region.

FIG. 4 shows an exemplary input image 54 over which are superimposed a boundary 56 demarcating an embodiment of a face region 58 corresponding to a region of the face of a person 60. In this example, the face region 58 has a horizontal dimension $w_{face}$ and a vertical dimension $h_{face}$. The areal dimension $A_{face}$ of the face region 58 is given by $A_{face} = w_{face} \times h_{face}$.

2. Computing Sharpness Parameter Values

The parameter extraction processing component 14 may determine the sharpness measures in a variety of different ways. In one exemplary embodiment, the sharpness factors are derived from estimates of local sharpness that correspond to an average ratio between the high-pass and low-pass energy of the one-dimensional intensity gradient in the detected face regions. In accordance with this embodiment, the intensity gradient is computed for each horizontal pixel line and vertical pixel column within each face region. For each horizontal and vertical pixel direction in which the gradient exceeds a gradient threshold, the parameter extraction processing component 14 computes a respective measure of local sharpness from the ratio of the high-pass energy and the low-pass energy of the gradient. A sharpness value is computed for each face region by averaging the sharpness values of all the lines and columns within the face region.

3. Computing Exposure Parameter Values

The parameter extraction processing component 14 may determine a respective measure of exposure for each face region in a wide variety of different ways. In one exemplary embodiment, the parameter extraction processing component 14 determines a measure of exposure for each face region based on counts of the number of over-exposed and under-exposed pixels within the face region. In this process, the parameter extraction processing component 14 labels pixels within a face region as over-exposed if (i) the luminance values of more than half the pixels within a window centered about the pixel exceed 249 or (ii) the ratio of the energy of the luminance gradient and the luminance variance exceeds 900 within the window and the mean luminance within the window exceeds 239. The parameter extraction processing component 14 labels pixels within the face region as under-exposed if (i) the luminance values of more than half the pixels within the window are below 6 or (ii) the ratio of the energy of the luminance gradient and the luminance variance within the window exceeds 900 and the mean luminance within the window is below 30. The parameter extraction processing component 14 calculates a respective over-exposure measure for each face region by subtracting the average number of over-exposed pixels within the section from 1. Similarly, the parameter extraction processing component 14 calculates a respective under-exposure measure for each section by subtracting the average number of under-exposed pixels within the section from 1. The resulting over-exposure measure and under-exposure measure are multiplied together to produce a respective exposure measure for each face region.

4. Computing Contrast Parameter Values

The parameter extraction processing component 14 may use any of a wide variety of different methods to compute a respective measure of contrast for each of the face regions. In some embodiments, the parameter extraction processing component 14 computes the contrast measures in accordance with the image contrast determination method that is described in U.S. Pat. No. 5,642,433. In some embodiments, the local contrast measure $\Omega_{contrast}$ is given by equation (1):

$$\Omega_{contrast} = \begin{matrix} 1 & \text{if } L_\sigma > 100 \\ 1 + L_\sigma/100 & \text{if } L_\sigma \leq 100 \end{matrix} \quad (1)$$

where $L_\sigma$ is the respective variance of the luminance of a given section.

5. Computing Brightness Parameter Values

The parameter extraction processing component 14 may use any of a wide variety of different methods to compute a respective measure of brightness for each of the face regions. In some embodiments, the brightness measures correspond to the average luminance of the face regions.

D. Exemplary Embodiments of the Cluster Processing Component

The cluster processing component 16 classifies as cluster seed face regions 38 ones of the face regions associated with parameter values 53 that satisfy a cluster seed predicate (FIG. 2, block 40; see FIGS. 1 and 3). The face regions associated with parameter values that do not satisfy the cluster seed predicate are classified as non-cluster-seed face regions 42.

The cluster seed predicate defines at least one condition on the parameter values 53 that are extracted from the detected face regions by the parameter extraction processing component 14.

In some embodiments, the cluster seed predicate corresponds to a threshold on the minimum size of each cluster seed face region. In one exemplary embodiment, the minimum size threshold specifies a minimum size of each face region in relation to the corresponding input image 20 containing the face region. In this embodiment, the cluster seed predicate $P_{seed}$ is given by equation (2):

$$P_{seed} = \left\{ \frac{\Omega_{face}}{\Omega_{image}} \geq \tau_{seed} \right\} \quad (2)$$

where $\Omega_{face}$ is the size of the face region, $\Omega_{image}$ is the size of the input image containing the face region, and $\tau_{seed}$ is the minimum size threshold. In some embodiments, $\Omega_{face}$ and $\Omega_{image}$ correspond to linear dimensions of the face region and the input image, respectively. In other embodiments, $\Omega_{face}$ and $\Omega_{image}$ respectively correspond to the areal dimensions of the face region and the input image.

In some embodiments, the cluster seed predicate specifies multiple conditions on the parameter values 53 of the cluster seed face regions. For example, in some embodiments, the cluster seed predicate specifies conditions on the values of two or more of parameters selected from: the size of the face region; the sharpness of the face region; the exposure level of the face region; the contrast level of the face region; the saturation level of the face region; and the brightness level of the face region. In some of these embodiments, the cluster processing component 16 applies a different respective threshold to each of the selected parameters, and face regions with parameter values that satisfy each of the thresholds are classified as cluster seed face regions whereas face regions with parameter values that do not satisfy any of the thresholds are classified as non-cluster-seed face regions. In other ones of these embodiments, the cluster processing component 16 computes a respective quality score for each of the face regions from the associated values for the selected parameters, and face regions with quality scores that satisfy a quality threshold are classified as cluster seed face regions whereas face regions with quality scores that do not satisfy the quality threshold are classified as non-cluster-seed face regions. In some of these embodiments, the quality score corresponds to a weighted average of the values of the selected parameters, where the weights and the quality threshold are empirically determined. In other embodiments, the cluster processing component 16 computes a respective quality score from the sharpness measure, the exposure measure, the contrast measure, and the saturation measure. In this process, the cluster processing component 16 determines the respective quality scores by computing the product of these measures for each face region, and scaling the resulting product to a specified dynamic range (e.g., 0 to 255). The resulting scaled value corresponds to a respective image quality score for the corresponding face region.

The cluster processing component 16 clusters the cluster seed face regions 36 into one or more clusters 44 (FIG. 2, block 46; see FIG. 3). In general, the cluster processing component 16 may cluster the cluster seed face regions in a wide variety of different ways, including but not limited to k nearest neighbor (k-NN) clustering, hierarchical agglomerative clustering, k-means clustering, and adaptive sample set construction clustering.

Figure 5:
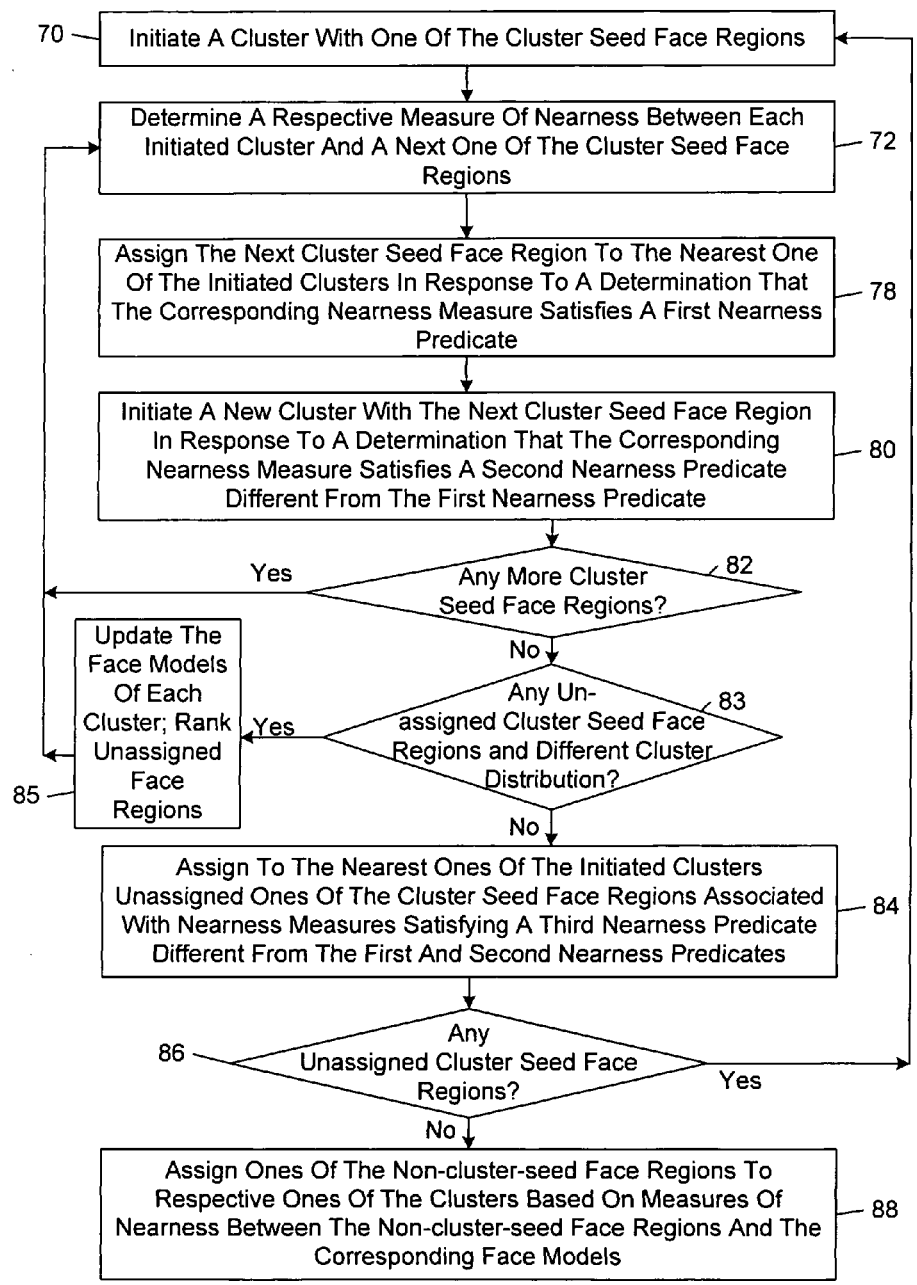
FIG. 5 is a flow diagram of an embodiment of a clustering method.

FIG. 5 shows an embodiment of an adaptive sample set construction clustering method that is executed by the cluster processing component 16 to cluster the cluster seed face regions 36. This method's use of multiple thresholds and iterative refinement of the clusters is expected to overcome the problems associated with the propagation of false alarms and thereby achieve superior results.

In accordance with this method, the cluster processing component 16 initiates a cluster with one of the cluster seed face regions (FIG. 5, block 70). In some embodiments, the cluster processing component 16 ranks the cluster seed face regions based on the values that are extracted for at least one parameter and selects the highest ranking cluster seed face region to initiate the cluster. In some of these embodiments, the cluster seed face regions are ranked in order from largest size ratio (i.e., the ratio of the face region size to the corresponding input image size) to lowest size ratio. In other ones of these embodiments, the cluster seed face regions are ranked in order from highest quality score to lowest quality score. In some embodiments, the cluster processing component 16 selects the initiating cluster seed region at random.

The cluster processing component 16 determines a respective measure of nearness ($\Omega_{NEARNESS}$) between each initiated cluster and a next one of the cluster seed face regions (FIG. 5, block 72). In general, the nearness measures may correspond to any type of measure that compares the relative closeness or similarity between each initiated cluster and the next cluster seed face region. In some embodiments, the model processing component 18 builds for each cluster a respective face model that is derived from facial features that are extracted from constituent face regions (see § II.E, below). In these embodiments, the cluster processing component 16 passes information 74 (see FIG. 1) to the model processing component 18, where the information 74 includes the cluster and the next cluster seed face region. The model processing component builds a face model that represents the cluster, extracts facial features from the next cluster seed face region, and computes a nearness measure 76 (see FIG. 1) based on the face model and the extracted facial features. The model processing component 18 passes the nearness measure 76 to the cluster processing component 16. In some implementations, the nearness measure corresponds to a similarity score between a feature vector representing the cluster and a feature vector representing the next cluster seed face region. In other implementations, the nearness measure is derived from a measure of distance (e.g., a vector norm, such as the L2-norm) between these feature vectors.

Figure 6:
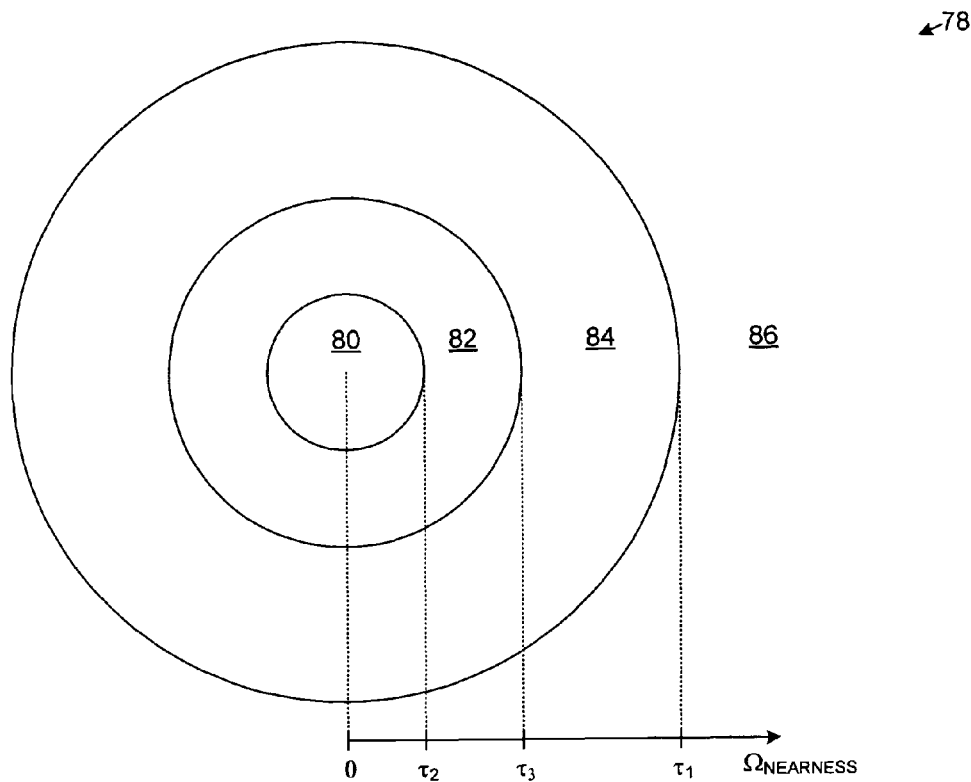
FIG. 6 is a schematic diagram of an embodiment of a face region feature space segmented into regions defined by their distance along a nearness measure dimension.

FIG. 6 shows an exemplary face region feature space 78 that is segmented into regions 80, 82, 84, 86 that are defined by boundaries demarcating different distances along a radial dimension corresponding to the nearness measure $\Omega_{NEARNESS}$ and originating at a zero nearness measure value.

The cluster processing component 16 assigns the next cluster seed face region to the nearest one of the initiated clusters in response to a determination that the corresponding nearness measure satisfies a first nearness predicate (FIG. 5, block 78). In some implementations, the first nearness predicate corresponds to a minimum nearness threshold value ($\tau_1$, see FIG. 6). Thus, in these implementations, the cluster processing component 16 assigns the next cluster seed face region to the nearest existing cluster if the nearness measure between the next cluster seed face region and the nearest existing cluster meets the minimum nearness threshold value.

The cluster processing component 16 initiates a new cluster with the next cluster seed face region in response to a determination that the corresponding nearness measure satisfies a second nearness predicate different from the first nearness predicate (FIG. 5, block 80). In some implementations, the second nearness predicate corresponds to a maximum nearness threshold value ($\tau_2$, see FIG. 6). Thus, in these implementations, the cluster processing component 16 initiates a new cluster with the next cluster seed face region if the nearness measure between the next cluster seed face region and the nearest existing cluster is below the second nearness threshold value ($\tau_2$, see FIG. 6).

The cluster processing component 16 repeats the processes of blocks 72, 78, and 80 for all successive ones of the cluster seed face regions (FIG. 5, block 82). In some embodiments, the successive ones of the cluster seed face regions are processed in rank order from highest rank to lowest rank.

After all of the cluster seed face regions have been processed in accordance with blocks 70-82 of FIG. 5, if there are any unassigned cluster seed face regions and the cluster distribution is not the same as the previous iteration (FIG. 5, block 83), the face model of each cluster is updated (FIG. 5, block 85). In this process, the cluster processing component 16 selects one or more faces within the cluster to update the face model. For example, in some embodiments, the cluster processing component updates each face model using one or more of the following types of face regions: (i) face regions that are most different from the existing face model (e.g., with the lowest face recognition score, or the face region corresponding to the most profile-oriented or rotated face); (ii) face regions that show facial angles that are different from the facial angles of the face regions used to build the existing face model; (iii) face regions that have the highest quality scores; and (iv) face regions that have the highest nearness scores. The cluster processing component 16 uses the features of the selected face regions to update the face models (FIG. 5, block 85). Next, the cluster processing component 16 ranks all the unassigned face regions (FIG. 5, block 85), and repeats the processes of blocks 72-85 for the ranked unassigned face regions using the updated face models.

The iteration of blocks 72-85 stops when there are no more unassigned cluster seed face regions or if the current cluster distribution is the same as the cluster distribution of the previous iteration (FIG. 5, block 83). Then, if there are still unassigned cluster seed face regions, the cluster processing component 16 assigns to the nearest ones of the initiated clusters unassigned ones of the cluster seed face regions that are associated with nearness measures satisfying a third nearness predicate that is different from the first and second nearness predicates (FIG. 5, block 84). In some implementations, the third nearness predicate corresponds to a minimum nearness threshold value ($\tau_3$, see FIG. 6) that is located between the first and second nearness threshold values $\tau_1$, $\tau_2$ on the nearness measurement axis. Thus, in these implementations, the cluster processing component 16 assigns unassigned ones of the cluster seed face regions to the nearest ones of the initiated clusters if the nearness measures between the unassigned cluster seed face regions and the nearest existing clusters are at or above the third nearness threshold value ($\tau_3$ see FIG. 6). The values of the first, second, and third nearness thresholds typically are determined empirically.

The cluster processing component 16 then repeats the processes of blocks 70-86 for any remaining cluster seed face regions (FIG. 5, block 86). In some embodiments, the remaining cluster seed face regions are ranked (e.g., in order of size ratio or in order of quality score) and clustered in rank order from highest rank to lowest rank.

After all of the cluster seed face regions have been assigned to respective clusters (FIG. 5, block 86), the cluster processing component 16 assigns ones of the non-cluster-seed face regions 42 (see FIG. 3) to respective ones of the clusters based on measures of nearness between the non-cluster-seed face regions and the corresponding face models that represent the clusters (FIG. 5, block 88). In some embodiments, the cluster processing component 16 assigns ones of the non-cluster-seed face regions to the nearest of the clusters if the corresponding nearness measure satisfies the third nearness predicate; otherwise the cluster processing component 16 assigns the non-cluster-seed face regions to a separate category, which may be labeled, for example, "other faces".

In some embodiments, the cluster processing component 16 automatically merges small clusters that contain only a few photos (e.g., clusters that contain fewer than N photos, where N may be 2 or 3) with larger ones of the clusters. In one exemplary embodiment, all faces in the small clusters are matched with each face model of the larger clusters, and when a face is successful in matching at least one of the face models, it is assigned to the cluster that it matches best; otherwise, the non-matching small cluster is assigned to the "other faces" category. In another embodiment, for one small cluster, if one or more faces in it match successfully with one larger cluster (e.g., the nearness measure between the small cluster and the nearest large cluster meets the third nearness predicate), the small cluster is merged with that larger cluster; otherwise, the small cluster is merged into the "other faces" category.

In some embodiments, the cluster processing component 16 incorporates knowledge and rules in the execution of one or more of the processes represented by the blocks of FIG. 5. For example, in some embodiments, if there are two or more faces detected from one photo, these faces are assigned to different clusters. In these embodiments, the cluster processing component 16 prevents clusters from containing more than one constituent face region from each of the images. This feature of the cluster processing component 16 reduces computational cost (e.g., if face regions X1 and X2 are from the same photo, and X1 is assigned to cluster Z1, then there is no need to compare face region X2 with cluster Z1) and reduces errors due to misclassifications.

E. Exemplary Embodiments of the Model Processing Component

The model processing component 18 builds a respective face model 24 for each of the clusters 44 (FIG. 2, block 50). In general, any type of facial feature extraction process may be used to extract features from the detected face regions that are reported in the facial parameter values 42 that are output by the face detection processing component 12. Exemplary facial feature extraction processes include, but are not limited to: edge, line and curve based feature extraction methods; extraction methods based on templates that are designed to detect specific feature points (e.g., the eyes and mouth); and structural matching methods. In some embodiments a principle component analysis (PCA) is used to decompose the feature space into a low-dimension subspace spanned by the first few eigenvectors, and a subspace orthogonal to the eigenvector space.

Figure 7:
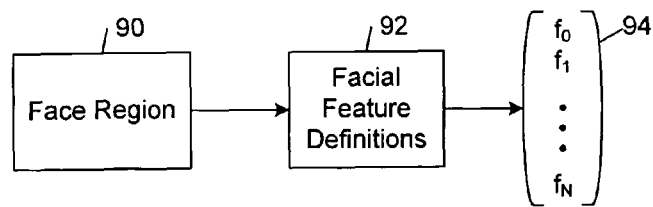
FIG. 7 is a diagrammatic view of an embodiment of a process of extracting features from a face region.

FIG. 7 shows an embodiment of a process that is implemented by an embodiment of the model processing component 18 to extract features from a detected face region 90. In accordance with this process, facial feature values ($f_0, f_1, \ldots$ , $f_N$) are extracted from the face region 90 in accordance with a set of facial feature definitions 92. Each facial feature definition corresponds to a rule that describes how to compute or measure a respective facial feature value ($f_0, f_1, \ldots, f_N$). Each feature value reflects the contribution of the corresponding facial feature to the representation of the face region 90 in the feature space spanned by the set of facial features 92. The set of facial feature values that are computed for the face region 90 constitutes a facial feature vector 94.

The model processing component 18 stores the face models 24 in the database 26 (FIG. 2, block 52). In some embodiments, the model processing component 18 also stores the cluster specifications 22 in association with respective ones of the input images 20 in the database 24.

Figure 8:
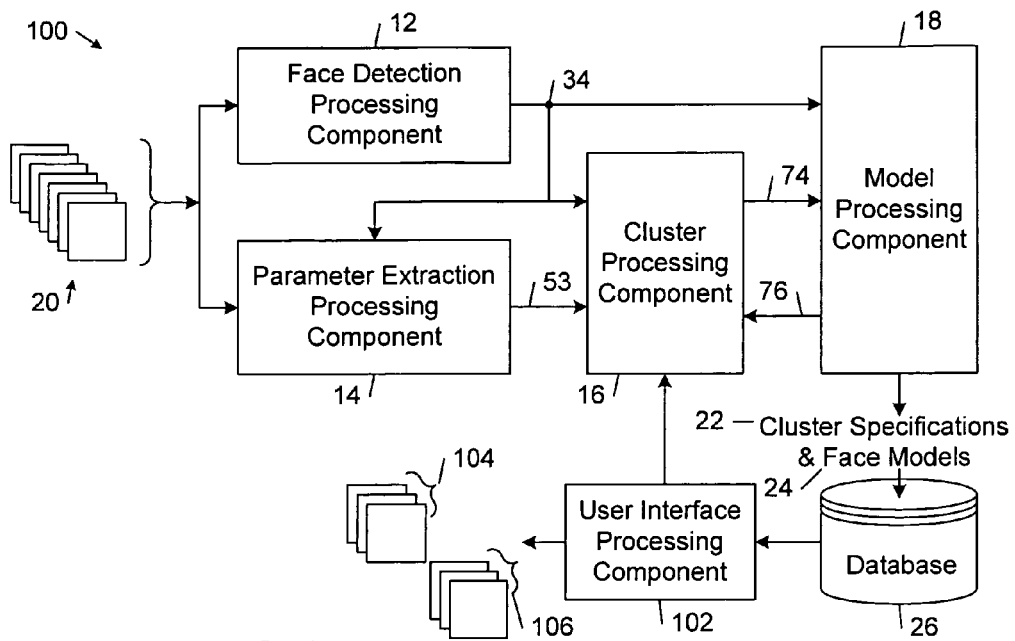
FIG. 8 is a block diagram of an embodiment of an image processing system.

III. Exemplary Embodiments of a Second Image Processing System and its Components FIG. 8 shows an embodiment of an image processing system 100 that corresponds to the image processing system 10 that is shown in FIG. 1, except that the image processing system 100 additionally includes a user interface processing component 102 through which a user interacts with the image processing system 10. In operation, the user interface processing component 102 renders representations 104, 106 of ones of the clusters 22 on a display. The display 26 may be, for example, a flat panel display, such as a LCD (liquid crystal display), a plasma display, an EL display (electro-luminescent display) and a FED (field emission display). In some implementations, the user interface processing component 102 allows a user to interactively browse the face clusters 104, 106 that are generated automatically on the display. The user interface processing component 102 also allows a user to specify edits to the face cluster specifications 22. Any specified edits to a given face cluster are interpreted by the user interface processing component 102. The user interface processing component 102 transmits the interpreted user command instructions to the cluster processing component 16. The cluster processing component 16 generates a modified specification for a given face cluster in accordance with the edits received from the user interface processing component 102 and the model processing component generates a revised face model 24 based on the modified cluster specification 22. The user interface processing component 102 presents the revised face cluster to the user, who may browse the revised face cluster, specify edits to the revised face cluster, or command the image processing system 100 to render some or all of the other face clusters.

Figure 9:
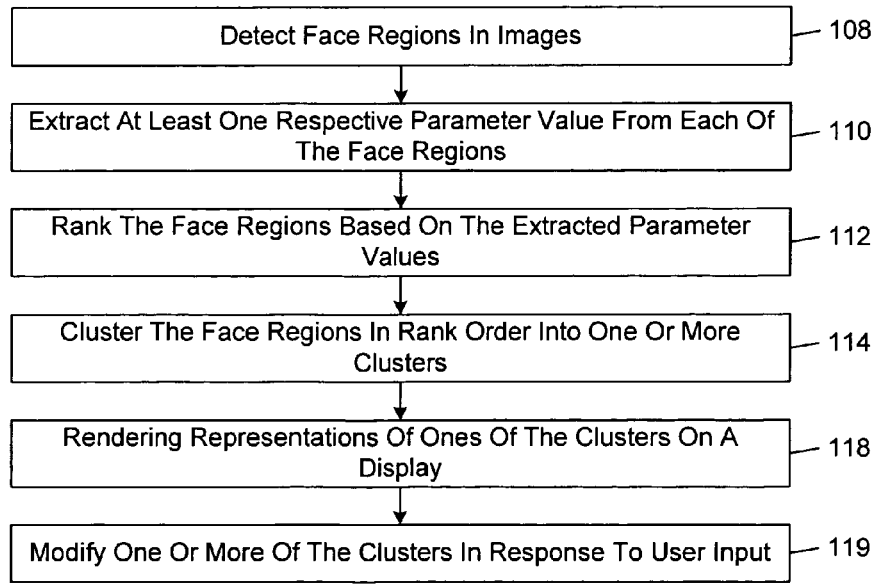
FIG. 9 is a flow diagram of an embodiment of an image processing method.

FIG. 9 shows an embodiment of a method that is implemented by an embodiment of the image processing system 100.

In accordance with this method, the face detection processing component 12 detects face regions in the images 20 (FIG. 9, block 108). The face detection processing component 12 may detect faces in accordance with any of the face detection methods described above. A respective bounding box typically is generated to represent the location and the size of each detected face.

The parameter extraction processing component 14 extracts at least one respective parameter value 34 from each of the face regions (FIG. 9, block 110). The parameter extraction processing component 14 may extract parameter values is from the face regions in accordance with any of the parameter extraction methods described above.

The cluster processing component 16 ranks the face regions based on the extracted parameter values (FIG. 9, block 112). In some embodiments, the cluster processing component 16 computes a respective quality score for each detected face in accordance with any of the methods described above. The quality score may be determined based on features of the face such as the size, the brightness, and the sharpness of the face. The size of the face may be the absolute size or the size in relation to the size of the corresponding input image, which is expressed as the ratio between the size of the facial bounding box and the size of the input image. For example, the relative size may be defined as the ratio between the length of the longer side of the bounding box and the length of the longer side of the corresponding input image. In some embodiments, the quality score is relatively high when the following conditions are met: the size of the face region is large in relation to the size of the input image; the face region is not over-exposed (too bright) nor under-exposed (too dark); and the face region is sharp (not blurry). In these embodiments, the face regions are ranked in accordance with the computed quality scores in descending order from highest quality score to lowest quality score.

After the face regions have been ranked (FIG. 9, block 112), the cluster processing component 16 clusters the face regions in rank order into one or more clusters (FIG. 9, block 114).

During the clustering process, the cluster processing component 16 works cooperatively with the model processing component 18. In some embodiments, the model processing component 18 is implemented by a face recognition engine. In these embodiments, the face recognition engine trains a face model with one or more faces in a given cluster. The face recognition engine extracts facial features from a query face region (e.g., the next face region being clustered). The face recognition engine matches the extracted features with the face model of the cluster and generates a nearness score in the range between 0 and 1 that indicates the degree of similarity between the query face region and the face model. Typically, the higher the nearness score, the more likely the query face region and the face cluster represent images of the same person. The face recognition engine applies an empirically determined threshold (T) to the nearness score. If the nearness score is higher than T, the face recognition engine reports that query face region matches the face cluster; otherwise, the face recognition engine reports that the query face region does not match the face cluster.

In general, the cluster processing component 16 may cluster the face regions in a wide variety of different ways, including but not limited to k nearest neighbor (k-NN) clustering, hierarchical agglomerative clustering, k-means clustering, and adaptive sample set construction clustering. In some embodiments, the cluster processing component 16 clusters the face regions as follows:

(1) The first face in the ranking list, X1, is selected as the representative of the first cluster. A face model M1 is trained for this cluster using facial features of X1.

(2) The next face X in the ranking list is selected, and is matched with all existing face models. Suppose $S_j(X, M_j)$ is the score of matching X with the $j^{th}$ face model, and i=arg max($S_j(X, M_j)$). If $S_i$>T, then assign X to the $i^{th}$ cluster; otherwise, a new cluster is formed with X as the representative, and a face model for this cluster is trained using facial features of X.

(3) Step (2) is continued until all faces in the ranked list are processed.

Figure 10:
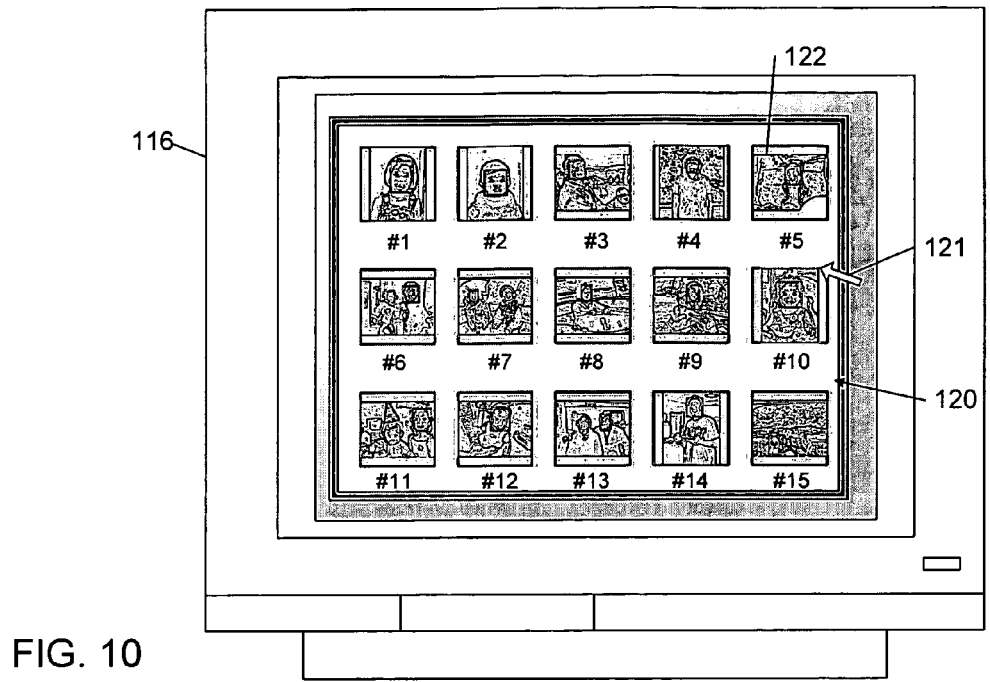
FIG. 10 is a diagrammatic view of a display presenting an embodiment of a graphical user interface for user review and modification of face clusters.

Referring to FIG. 10, after the face regions have been clustered (FIG. 9, block 114), the user interface processing component 102 renders representations of ones of the clusters on a display 116 (FIG. 9, block 118). The user interface processing component 102 allows the user to specify one or more modifications to the face clusters. The cluster processing component 16 and the model processing component 18 cooperatively modify one or more of the clusters in response to user input (FIG. 9, block 119). The user can specify commands to the user interface processing component 102 through manipulation of an input device (e.g., a computer mouse) that outputs display control signals to a display controller, which drives the display 116. The display control signals typically are in the form of motion measures that typically correspond to one or more of displacement parameter values, velocity parameter values, and acceleration parameter values. The display controller processes the display control signals to control, for example, the movement of a pointer 121 on the display 116.

In some embodiments, the user interface processing component 102 renders the cluster representations in a multi-level graphical user interface. At the first level 120 of the graphical user interface, thumbnails 122 of the input images 20 containing a representative face of each of the clusters are displayed, as shown in FIG. 10. In some embodiments, the clusters are ranked according to the number of input images contained in the clusters, and the thumbnails 122 are shown in rank order. Therefore, the largest clusters are rendered in the top row of the graphical user interface level 120 shown in FIG. 10.

Figure 11:
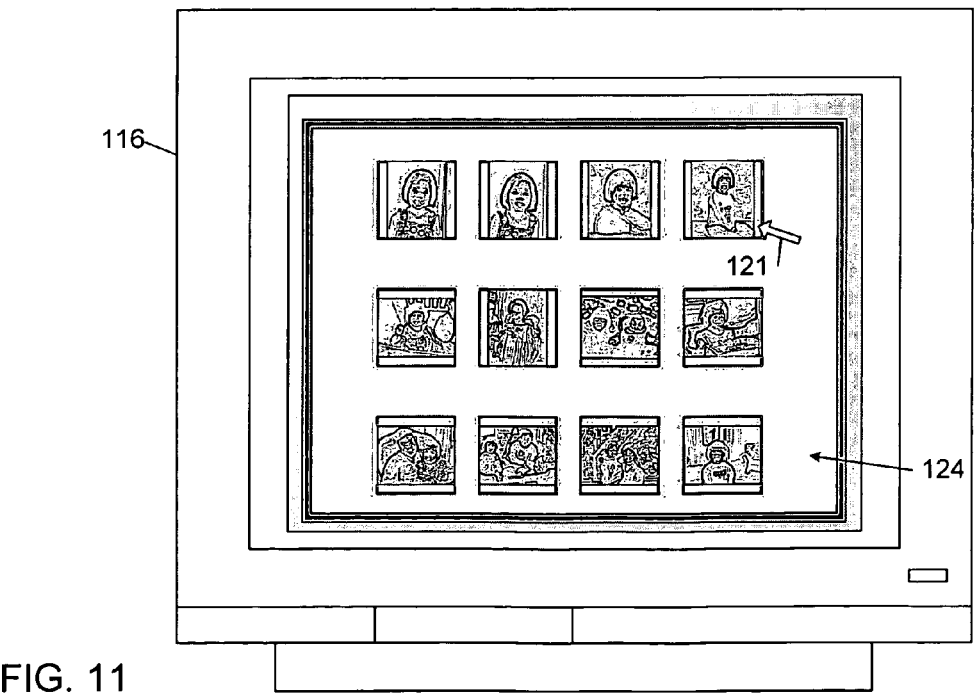
FIG. 11 is a diagrammatic view of a display presenting an embodiment of a graphical user interface for user review and modification of face clusters.

In operation, in response to the user's selection of one of the thumbnails 122 in the graphical user interface level 120, the user interface processing component 102 renders thumbnails that correspond to all of the images in the face cluster represented by the selected thumbnail. As shown in FIG. 11, at the second level 124 of the graphical user interface, the input images within the selected cluster are ranked according to their associated face recognition similarity scores (i.e., the score obtained by matching the face region of the input image with the face model of the cluster), and the thumbnails of the pictures are shown in accordance with the similarity score, from highest similarity score to lowest similarity score. Therefore, in FIG. 11, the top row of thumbnails contains face regions that are determined to be most similar to the face model of the cluster.

In this way, the graphical user interface allows the user to review the initial clustering result. In the course of this review, the user may find that some clusters are interesting and others are not. For example, the first several clusters (i.e., the largest clusters) that are presented in the first level 120 of the graphical user interface may contain pictures of family members, and may be most important to the user, whereas some of the small clusters (e.g., clusters that contain only one or a few pictures) may contain pictures that are not of interest to the user. Optionally, the user may select the low-importance small clusters and merge them into a separate category, which may be labeled "others". In some embodiments, the clusters in the "others" category are not shown in the graphical user interface in subsequent iterations.

The graphical user interface allows the user to select one particular cluster and modify the constituent images that are within the cluster. For example, upon review of the members of the cluster, the user may find that some pictures in the cluster are false alarms or that some other clusters should be merged with the selected cluster because they represent the same person. The graphical user interface allows the user to identify false alarms in the selected cluster and to merge other clusters with the selected cluster.

Any changes to the selected cluster serve as feedback to the image processing system 100. Based on the feedback, the cluster processing component 16 modifies the specification of the modified cluster and the model processing component rebuilds (or retrains) the face model corresponding to the modified cluster. In the illustrative example shown in FIG. 10, clusters #7 and #8 represent the same person as the person represented by cluster #1. Therefore, in response to the user's selection of the thumbnails of clusters #7 and #8, the image processing system 100 merges the selected clusters with cluster #1 and the model processing component 18 re-trains the model for cluster #1 by adding the facial features from the face models of clusters #7 and #8. In this example, compared with the original face model of cluster #1, cluster #7 provides more information about the person's face when viewed from a lower angle and cluster #8 provides more information about the profile of the face. This additional information helps to build a more comprehensive model of the person's face.

At the same time, facial features of false alarms that were identified and corrected by the user (the user does not need to pick all the false alarms, but just a subset) are de-emphasized in the re-training process. In some embodiments, when more than a specified number (e.g., 1 or 2) of false alarms within one cluster actually contain the face of the same person, the cluster processing component 16 may create a new cluster for that person and the model processing component 18 may build a new face model for that cluster by training a new face model using one or more of the false alarm faces.

In general, the graphical user interface allows the user to (1) split a cluster into two or more clusters if it contains multiple images of each of multiple people; (2) merge two or more clusters if they are of the same person; (3) add one or more images from some clusters into another cluster; and (4) remove one or more images from a cluster. The user makes the above choices by clicking on and/or dragging thumbnails of clusters with an input device, such as a computer mouse. In response to each of these cluster modifications, the cluster processing component 16 updates the cluster specifications 22 and the model processing component 18 trains a new face model or retrains an existing face model by emphasizing or de-emphasizing some facial features.

After the first round of re-training face models of the clusters selected by the user, images are reassigned to the clusters based on the adjusted face models and the face recognition engine in accordance with any of the clustering methods described above. The new clustering results are rendered on the display 116 as shown in FIGS. 10 and 11. Then, the user may review the result and provide more feedback to improve the clustering accuracy. These iterations may continue until the user is satisfied with the result.

Most computations, including face detection, facial feature extraction, and initial matching and clustering, are executed automatically by the image processing system 100. The user may leave the system working alone during the execution of these processing steps. During the interactive part in which the user is involved, the computational cost imposed by the clustering method is rather modest (e.g., the retraining of facial models and the reassignment of pictures to clusters). Therefore, the user-machine interaction portion of the clustering method is relatively efficient and requires relatively few computational resources to implement.

IV. Conclusion

The embodiments that are described in detail herein cluster images based on face regions that are detected in the images. These embodiments leverage methods of building face models of the clusters that are expected to provide more accurate and more robust clustering results. In some of these embodiments, the clusters are initiated with cluster seed face regions that are selected to provide a more accurate and robust basis for establishing the face clusters. In addition, some embodiments rank the face regions in accordance with one or more parameters that are expected to emphasize face regions that are likely to contain more accurate representations of persons' faces. In these embodiments, the face regions are clustered in order from highest rank to lowest rank to achieve improved clustering results. In some embodiments, user feedback is used to further improve the cluster accuracy of the clustering results.

Other embodiments are within the scope of the claims.

What is claimed is:

1. A method, comprising:
   detecting face regions in images;
   extracting at least one respective parameter value from each of the face regions;
   classifying as cluster seed face regions ones of the face regions associated with parameter values satisfying a cluster seed predicate;
   clustering the cluster seed face regions into one or more clusters;
   building a respective face model for each of the clusters; and
   storing the face models.

2. The method of claim 1, wherein the extracting comprises determining for each of the face regions respective values for one or more of the following parameters: a measure of sharpness of the face region; a measure of contrast of the face region; a measure of saturation of the face region; and a measure of exposure of the face region.

3. The method of claim 1, wherein the extracting comprises determining respective size parameter values specifying sizes of the face regions.

4. The method of claim 3, wherein the determining comprises determining the respective size parameter values specifying the sizes of the face regions in relation to sizes of corresponding ones of the images containing the face regions.

5. The method of claim 1, wherein the classifying comprises classifying as non-cluster-seed face regions each of the face regions associated with at least one of: a brightness parameter value that fails to meet a brightness predicate; and a sharpness parameter value that fails to meet a sharpness predicate.

6. The method of claim 5, wherein the clustering comprises assigning ones of the non-cluster-seed face regions to respective ones of the clusters based on measures of nearness between the non-cluster-seed face regions and the corresponding face models.

7. The method of claim 1, wherein the clustering comprises:
   (a) initiating a cluster with one of the cluster seed face regions;
   (b) determining a respective measure of nearness between each initiated cluster and a next one of the cluster seed face regions;
   (c) assigning the next cluster seed face region to the nearest one of the initiated clusters in response to a determination that the corresponding nearness measure satisfies a first nearness predicate;
   (d) initiating a new cluster with the next cluster seed face region in response to a determination that the corresponding nearness measure satisfies a second nearness predicate different from the first nearness predicate; and
   (e) repeating (b)-(d) for all successive ones of the cluster seed face regions.

8. The method of claim 7, wherein, before (a), the clustering comprises ranking the cluster seed face regions based on the values extracted for at least one parameter, and (b) comprises selecting the next cluster seed face region in rank order from highest rank to lowest rank.

9. The method of claim 7, wherein (b) comprises the building of a respective face model for each initiated cluster based on features extracted from its constituent cluster seed face regions and determining a respective measure of nearness between features extracted from the next cluster seed face region and each of the face models.

10. The method of claim 7, wherein, after (e), the clustering comprises (f) assigning to the nearest ones of the initiated clusters unassigned ones of the cluster seed face regions associated with nearness measures satisfying a third nearness predicate different from the first and second nearness predicates.

11. The method of claim 10, wherein, after (f), repeating (a)-(e) for ones of the cluster seed face regions unassigned to any of the initiated clusters.

12. The method of claim 1, wherein the clustering comprises automatically merging clusters containing respective numbers of constituent face regions that fail to meet a count threshold.

13. The method of claim 1, wherein the clustering comprises preventing clusters from containing more than one constituent face region from each of the images.

14. The method of claim 1, further comprising rendering representations of ones of the clusters on a display, modifying ones of the rendered clusters in response to user input, and rebuilding a respective face model for each of the modified clusters.

15. The method of claim 1, wherein the classifying comprises classifying as non-cluster-seed face regions each of the face regions associated with one or more size parameter values that fail to meet a size predicate.

16. An apparatus, comprising; a computer-readable medium storing computer-readable instructions; and
   a processor coupled to the computer-readable medium, operable to execute the instructions, and based at least in part on the execution of the instructions operable to perform operations comprising
   detecting face regions in images,
   extracting at least one respective parameter value from each of the face regions,
   classifying as cluster seed face regions ones of the face regions associated with parameter values satisfying a cluster seed predicate,
   clustering the cluster seed face regions into one or more clusters, and
   building a respective face model for each of the clusters, and store the face models.

17. The apparatus of claim 16, wherein the processor is operable to classify as non-cluster-seed face regions each of the face regions associated with at least one of: a brightness parameter value that fails to meet a brightness predicate; and a sharpness parameter value that fails to meet a sharpness predicate.

18. The apparatus of claim 17, wherein the processor is operable to assign ones of the non-cluster-seed face regions to respective ones of the clusters based on measures of nearness between the non-cluster-seed face regions and the corresponding face models.

19. The apparatus of claim 16, wherein the processor is operable to perform operations comprising:
   (a) initiating a cluster with one of the cluster seed face regions;
   (b) determining a respective measure of nearness between each initiated cluster and a next one of the cluster seed face regions;
   (c) assigning the next cluster seed face region to the nearest one of the initiated clusters in response to a determination that the corresponding nearness measure satisfies a first nearness predicate;

(d) initiating a new cluster with the next cluster seed face region in response to a determination that the corresponding nearness measure satisfies a second nearness predicate different from the first nearness predicate; and (e) repeating (b)-(d) for all successive ones of the cluster seed face regions.

20. The apparatus of claim 16, wherein the classifying comprises classifying as non-cluster-seed face regions each of the face regions associated with one or more size parameter values that fail to meet a size predicate.

21. A method, comprising:

detecting face regions in images;

extracting at least one respective parameter value from each of the face regions;

ranking the face regions based on the extracted parameter values;

clustering the face regions in rank order into one or more clusters; and rendering representations of ones of the clusters on a display.

22. The method of claim 21, further comprising building a respective face model for each of the clusters, modifying one or more of the clusters in response to user input, and rebuilding a respective face model for each of the modified clusters.

* * * * *

UNITED STATES PATENT AND TRADEMARK OFFICE
CERTIFICATE OF CORRECTION

PATENT NO.          : 8,031,914 B2
APPLICATION NO.     : 11/545898
DATED               : October 4, 2011
INVENTOR(S)         : Tong Zhang It is certified that error appears in the above-identified patent and that said Letters Patent is hereby corrected as shown below:

In column 16, line 30, in Claim 16, delete "comprising;" and insert -- comprising: --, therefor.

Signed and Sealed this
Fifteenth Day of May, 2012

David J. Kappos
*Director of the United States Patent and Trademark Office*